United States Patent [19]
Lindsay et al.

[11] 3,778,202
[45] Dec. 11, 1973

[54] POWER TRANSMISSION

[75] Inventors: Anthony Lindsay, Troy; Ronald Lee Imperati, Livonia; Philipp Becker, Rochester, all of Mich.

[73] Assignee: Sperry Rand Corporation, Troy, Mich.

[22] Filed: Feb. 17, 1972

[21] Appl. No.: 227,226

[52] U.S. Cl. .............................................. 418/206
[51] Int. Cl. .............................................. F01c 1/18
[58] Field of Search ...................... 418/205, 206; 308/26

[56] References Cited
UNITED STATES PATENTS
3,602,616  8/1971  Jung.............................. 418/206 X
3,574,492  4/1971  Schwary........................... 418/206

Primary Examiner—Carlton R. Croyle
Assistant Examiner—Michael Koczo, Jr.
Attorney—Theodore Van Meter

[57] ABSTRACT

A gear pump or motor mounts the gears in the body by means of shaft journals projecting on opposite sides of each gear into bearings in the body. The bearing portions of the body are formed as cantilevers which are free to deflect under fluid pressure forces and follow the deflection of the shaft journals under the same forces. This reduces the localized loadings at the corners of the bearings and enables the device to operate at higher pressures than is possible with journal bearings solidly supported in the body.

1 Claim, 3 Drawing Figures

POWER TRANSMISSION

In gear pumps or motors which utilize plain journal bearings for the gears, a limiting factor upon the maximum safe operating pressure is the load capacity of these journal bearings. Because of the deflections occurring in the gear shafts under the application of fluid pressure forces, the bearings become highly loaded at their inner ends adjacent the gear faces and the full capacity of the bearings to support a theoretically undeflectable shaft cannot be utilized. To overcome this problem, the present invention provides journal bearings which are supported as cantilevers in the body and are free to deflect under fluid pressure forces to substantially the same degree that the gear shafts deflect.

The present invention then consists in a gear pump or motor which comprises a plurality of intermeshing gears, each having shafts projecting from opposite ends thereof to provide supporting journals, a body enclosing the gears and providing bearings for the journals, inlet and outlet passages in the body communicating with opposite sides of the meshing point of the gears, each of the bearings in the body being formed as a cantilever supported in the body at the outer end of its respective shaft and free to flex toward the inlet passage at the inner end of the shaft, whereby pressure forces causing deflection of the shafts will cause corresponding deflection of the bearings and localized loadings of the bearings are reduced.

IN THE DRAWING

Figure 1:
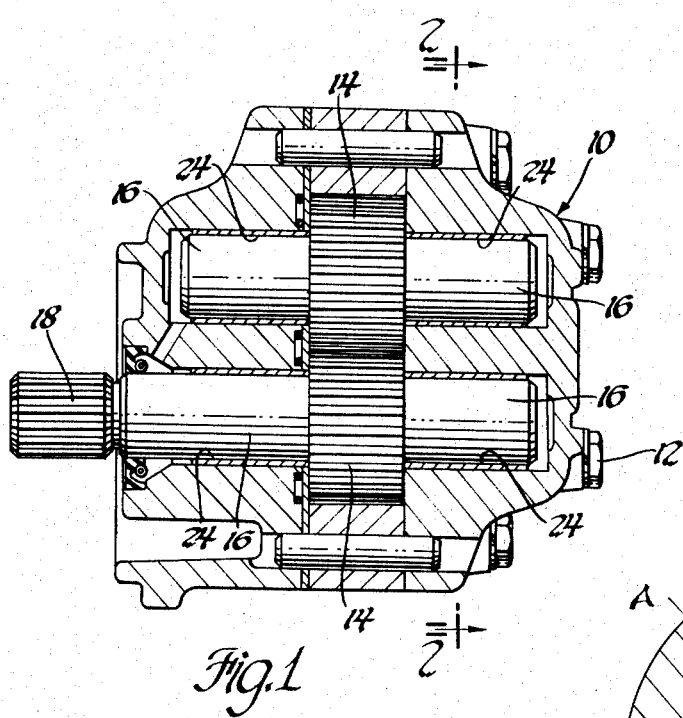
FIG. 1 is a longitudinal cross section of a gear pump embodying a preferred form of the present invention.
Figure 2:
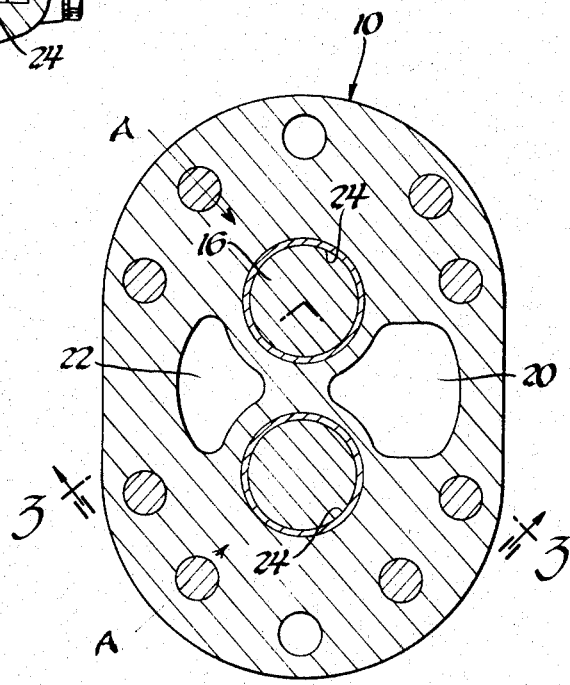
FIG. 2 is a cross section on line 2—2 of FIG. 1.
Figure 3:
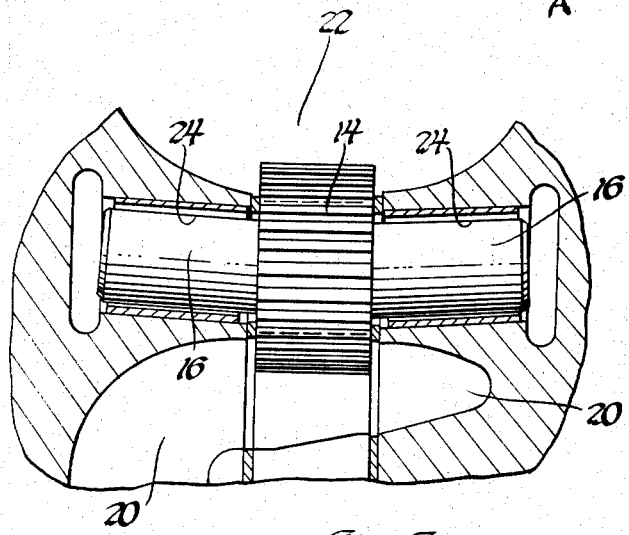
FIG. 3 is a fragmentary cross section on line 3—3 of FIG. 2.

In the embodiment disclosed, a gear pump has a body 10 formed in three sections secured together by bolts 12 and enclosing a pair of gears 14. Each gear has integral shafts 16 forming supporting journals for the gears and one of the shafts has a driving spline 18. An inlet passage 20 and an outlet passage 22 are formed in the body 10 and communicate with suitable terminal connections, not illustrated.

The shafts 16 each turn in plain bearings 24 which receive lubrication in the usual way from the hydraulic fluid being handled by the pump. These bearings are formed as cantilevers integral with the body at the outer ends of the respective shafts and free to flex to a limited degree at their inner ends adjacent the gears themselves. Thus, the inlet passage is enlarged and extends on both sides of the gears around a substantial arcuate distance so as to leave the cantilever unsupported on that side of the shaft opposite to the lines of thrust (arrow A) of the hydraulic pressure forces applied to the gears and to the surface of the cantilever bearing exposed to outlet pressure in the passage 22. The configuration of the cantilever bearing portions is preferably chosen so that their ratio of load to deflection is somewhat higher than the ratio of load to deflection of the shafts 16, thus allowing for the additional force which the cantilevers receive from the fluid pressure in the outlet passage 22. This pressure, of course, acts only on the gears 14 so far as any tendency to deflect the shafts 16 is concerned. In this way, the bearings 24 are able to carry substantially higher loads than they otherwise would if they were supported solidly throughout their length in the body 10.

We claim:

1. A gear pump or motor comprising a plurality of intermeshing gears, each having shafts projecting from opposite ends thereof to provide supporting journals, a body enclosing the gears and providing bearings for the journals, inlet and outlet passages in the body communicating with opposite sides of the meshing point of the gears, each of the bearings in the body being formed as a cantilever supported in the body at the outer end of its respective shaft and free to flex toward the inlet passage at the inner end of the shaft, whereby the pressure forces causing deflection of the shafts will cause corresponding deflection of the bearings and localized loadings of the bearings are reduced.

* * * * *

UNITED STATES PATENT OFFICE
CERTIFICATE OF CORRECTION

Patent No. 3,778,202　　　　　　Dated December 11, 1973

Inventor(s) Anthony Lindsay et al.

It is certified that error appears in the above-identified patent and that said Letters Patent are hereby corrected as shown below:

At the end of Claim 1 before the period, insert -- , the ratio of load to deflection of the bearing cantilevers being substantially higher than the corresponding ratio of the shafts to allow for the greater areas of the bearing cantilevers which are exposed to outlet pressure --.

Signed and sealed this 24th day of September 1974.

(SEAL)
Attest:

McCOY M. GIBSON JR.　　　　　　C. MARSHALL DANN
Attesting Officer　　　　　　　Commissioner of Patents